Sept. 28, 1954      A. SKOK      2,690,164
FLUID MOTOR
Filed May 12, 1950      5 Sheets-Sheet 1
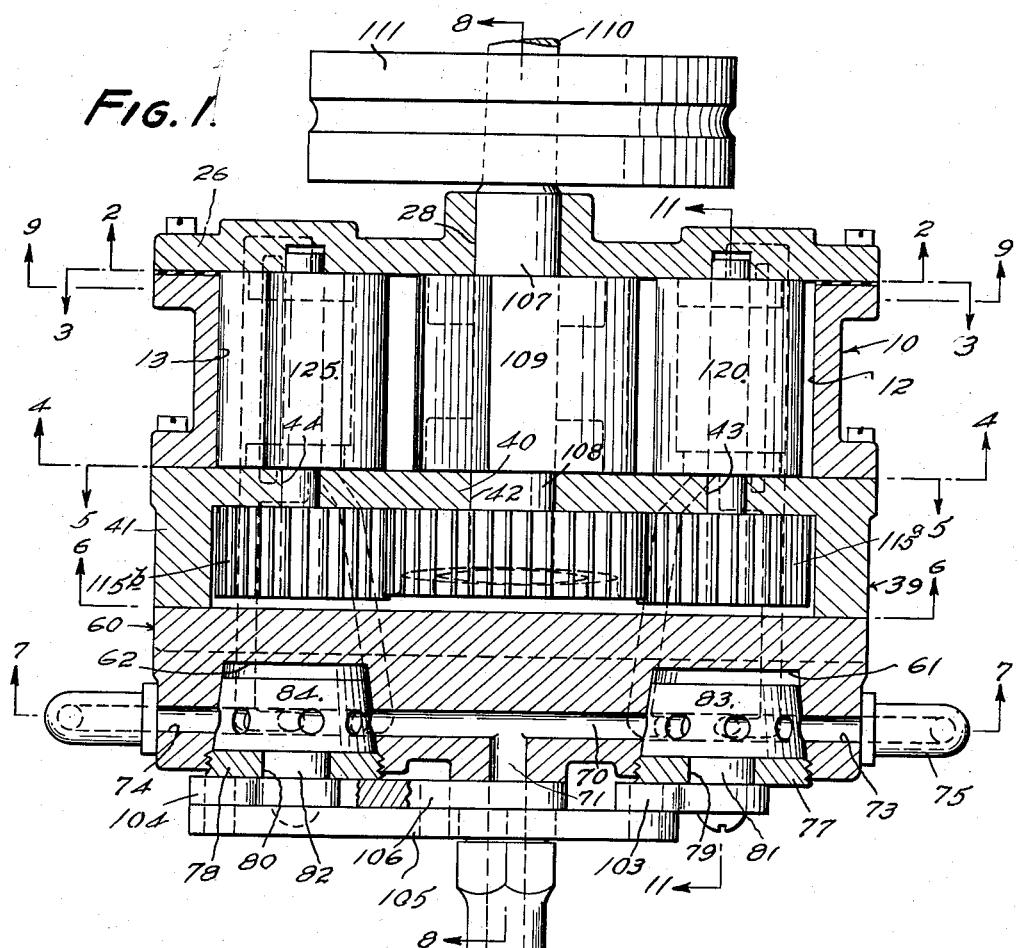
INVENTOR.
ALOIS SKOK
BY Wilfred E. Lawson
ATTORNEY.

Sept. 28, 1954  A. SKOK  2,690,164
FLUID MOTOR
Filed May 12, 1950  5 Sheets-Sheet 2
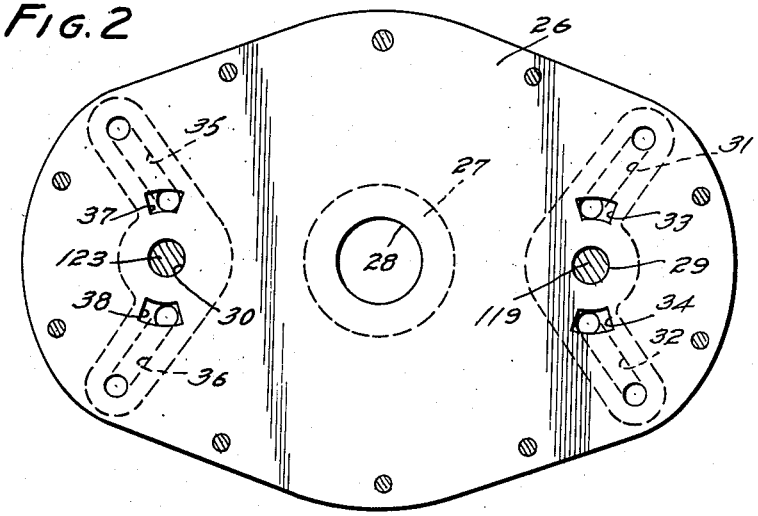
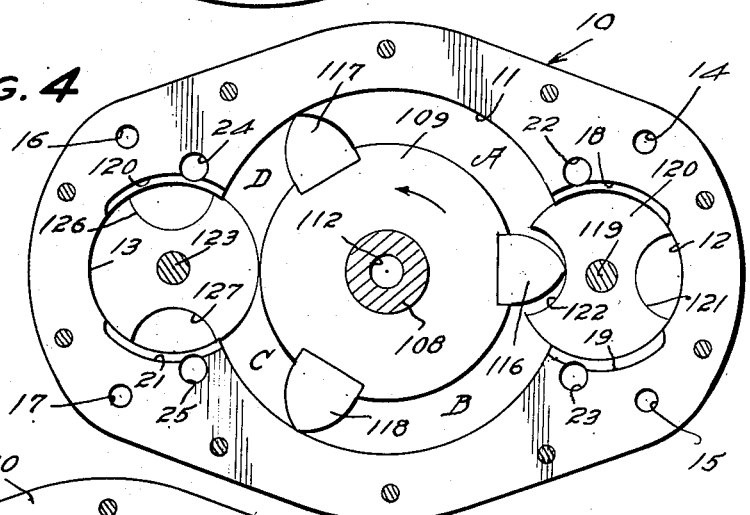
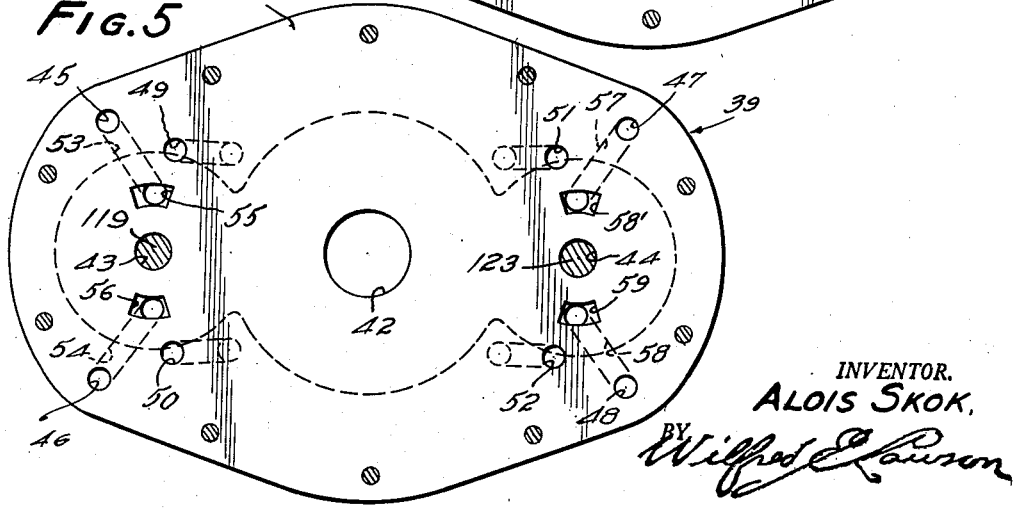
INVENTOR.
ALOIS SKOK,
BY Wilfred E. Lawson
ATTORNEY.

Sept. 28, 1954  A. SKOK  2,690,164
FLUID MOTOR
Filed May 12, 1950  5 Sheets-Sheet 3
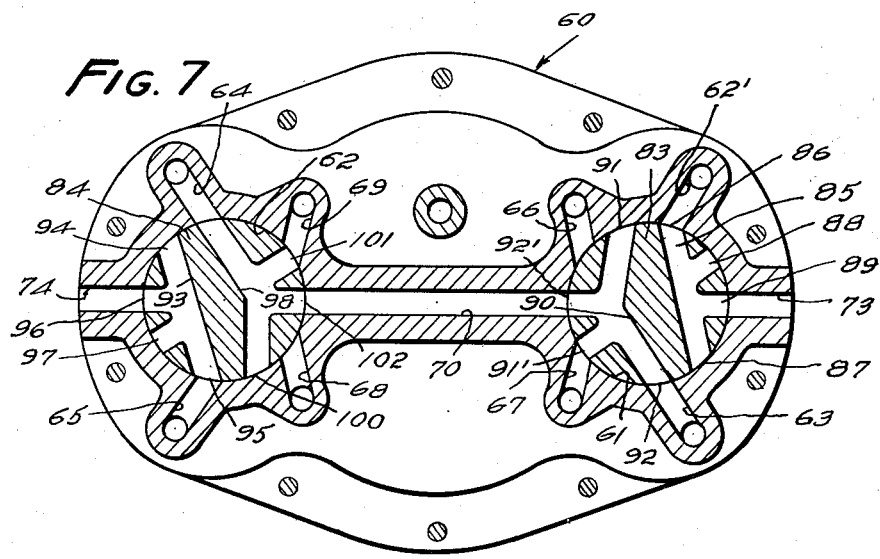
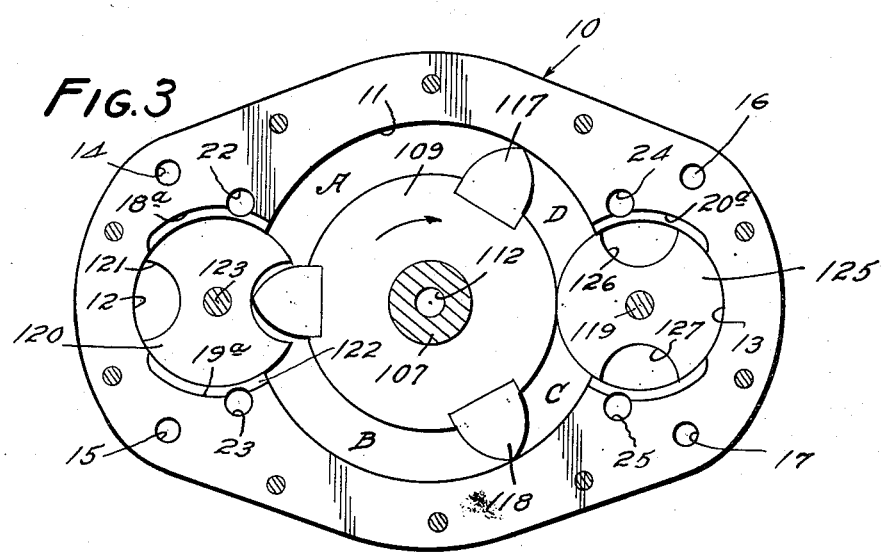
INVENTOR.
ALOIS SKOK,
BY
Wilfred E Lawson
ATTORNEY.

INVENTOR.
ALOIS SKOK
BY Wilfred E. Lawson
ATTORNEY.

Sept. 28, 1954　　　　　　　A. SKOK　　　　　　2,690,164
　　　　　　　　　　　　FLUID MOTOR
Filed May 12, 1950　　　　　　　　　　　　5 Sheets-Sheet 5
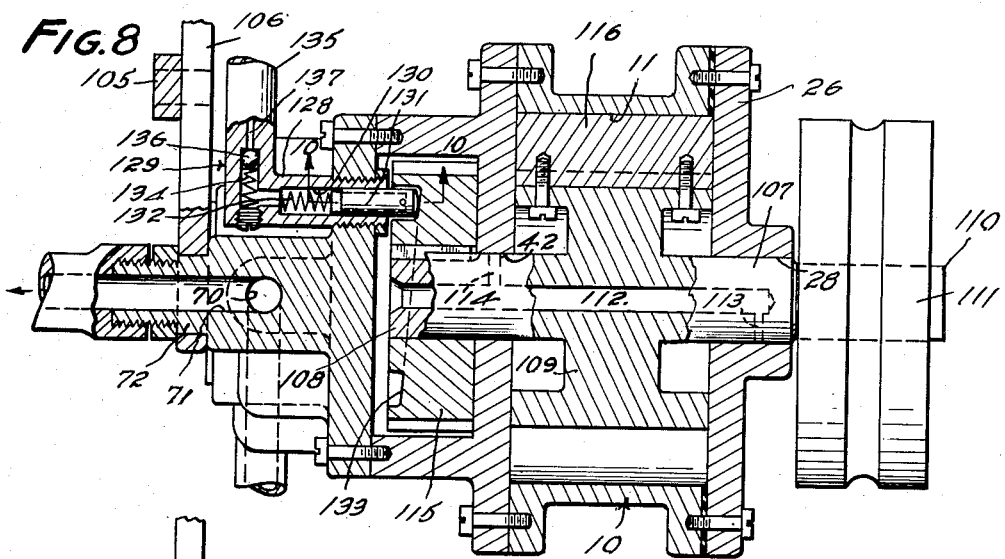
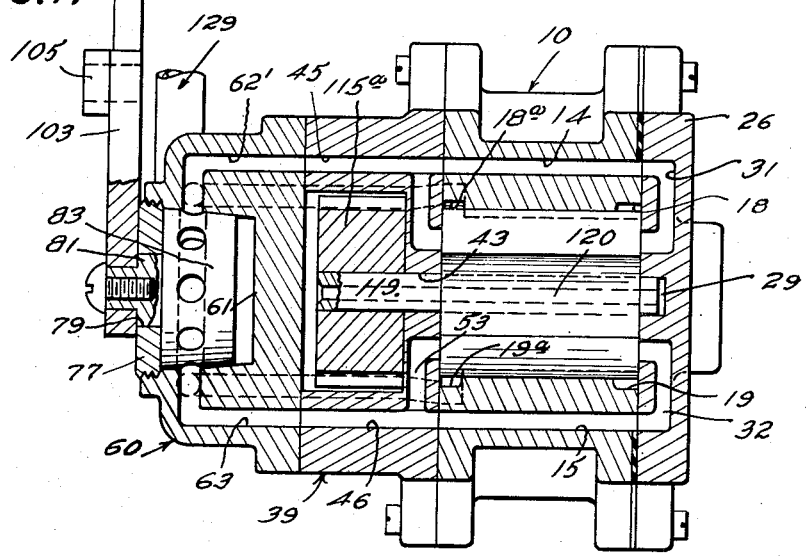
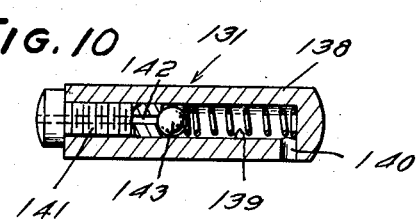
INVENTOR.
ALOIS SKOK
BY Wilfred E. Lawson
　　　　　ATTORNEY.

Patented Sept. 28, 1954

2,690,164

UNITED STATES PATENT OFFICE 2,690,164

FLUID MOTOR

Alois Skok, Pasadena, Calif.

Application May 12, 1950, Serial No. 161,547

2 Claims. (Cl. 121—71)

1

This invention relates to a fluid motor and more particularly to a motor or engine that may be driven by an expansible fluid such as steam. The primary object of the invention is to efficiently and economically employ the expansive energy of an expansible fluid and convert it into useful energy.

Another object is to simplify the construction of engines of the rotary type and hence facilitate the production thereof on an economical basis. A further object is to produce an engine which is compact and which will deliver a maximum of power per pound of weight and hence render such engines adapted for use as portable power units.

The above and other objects may be attained by employing this invention which embodies a casing having a circular cylindrical bore therein and parallel circular cylindrical chambers on opposite sides of the bore which open into the bore, a rotor mounted in the casing to rotate about the longitudinal axis thereof, radial blades on the rotor which project outwardly therefrom and move in a circular path which intersects the chambers, circular cylindrical members mounted in the chambers for rotation therein about the longitudinal axes thereof, said members projecting into the bore and contacting the periphery of the rotor, said members having peripherally spaced longitudinal grooves therein for receiving the radial blades as the rotor rotates, means to admit an expansible fluid into the bore in the space between a member on one side of the axis thereof and a blade, and means to discharge expansible fluid from the space on the side of the axis of said member and another radial blade.

Other features include valves for directing the flow of expansible fluid to one or the other side of the axis of a rotary member and to discharge expansible fluid from the opposite side of the axis of said rotary member thereby to control the direction of rotation of the rotor and rotary members. Still other features include means connected to the rotor and to the circular cylindrical members to cause said members to rotate as the rotor moves and means mounted in the casing to distribute lubrication to the moving parts.

In the drawings:

Figure 1 is a horizontal sectional view of an engine constructed in accordance with this invention;

Figure 2 is a transverse sectional view taken substantially along the line 2—2 of Figure 1;

Figure 3 is a transverse sectional view taken substantially along the line 3—3 of Figure 1;

2

Figure 6:
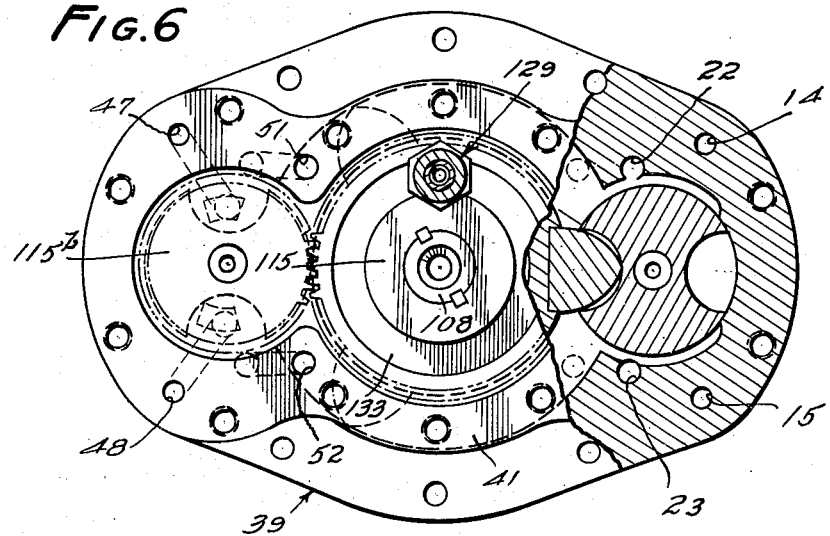
Figure 12:
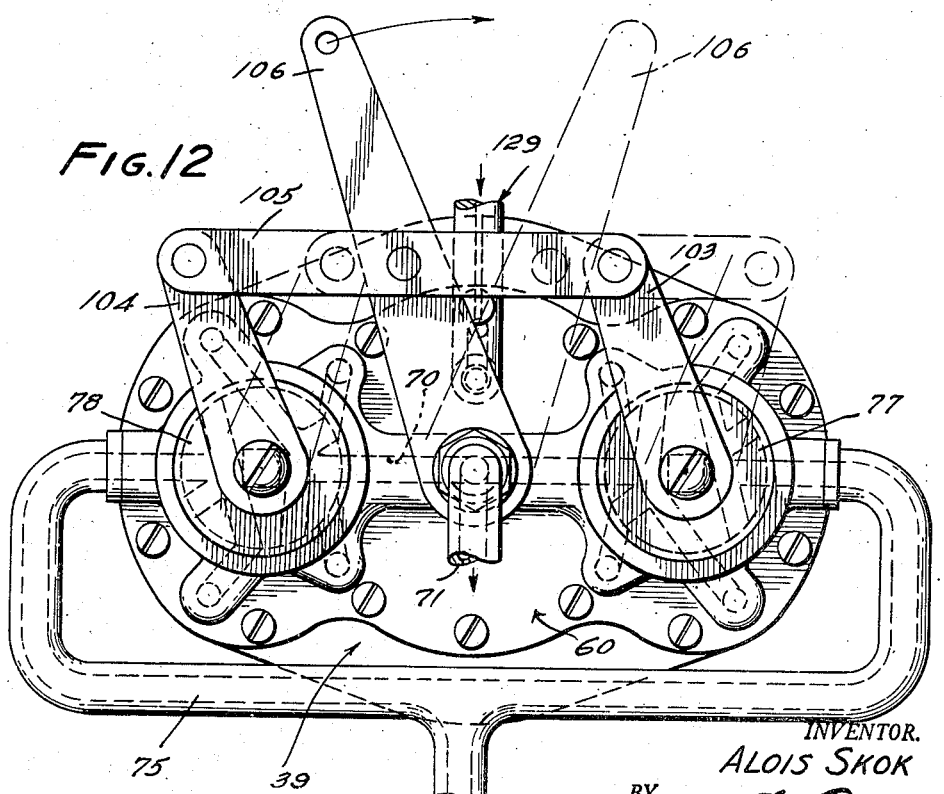

Figure 4 is a view similar to Figure 3 taken substantially along the line 4—4 of Figure 1;

Figure 5 is a transverse sectional view taken substantially along the line 5—5 of Figure 1;

Figure 6 is a transverse sectional view taken substantially along the line 6—6 of Figure 1;

Figure 7 is a transverse sectional view taken substantially along the line 7—7 of Figure 1;

Figure 8 is a longitudinal sectional view taken substantially along the line 8—8 of Figure 1;

Figure 9 is a transverse sectional view taken substantially along the line 9—9 of Figure 1;

Figure 10 is a longitudinal sectional view taken substantially along the line 10—10 of Figure 8;

Figure 11 is a sectional view taken substantially along the line of 11—11 of Figure 1 which has been distorted to show certain passages through the engine; and Figure 12 is a front view in elevation of the engine disclosed in Figure 1.

Referring to the drawings in detail a casing designated generally 10 is provided with an axial bore 11 and parallel circular cylindrical chambers 12 and 13 which lie on opposite sides of said bore 11 and open thereinto as will be readily understood upon reference to Figure 9. The casing 10 is also provided adjacent the chamber 12 with a pair of spaced parallel passages 14 and 15 and adjacent the chamber 13 with spaced parallel passages 16 and 17. Formed in opposite ends of the casing in diametrically spaced relation to the chamber 12 are relatively shallow grooves 18 and 18a and 19 and 19a and similar grooves 20 and 20a and 21 and 21a are formed in the casing 10 in diametrically spaced relation to the chamber 13. These grooves form ports which are in constant communication with the bore 11. Passages 22 and 23 are formed in the casing 10 and communicate with adjacent grooves 18, and 18a and 19 and 19a respectively and similar passages 24 and 25 extend through the casing and communicate respectively with the grooves 20 and 20a and 21 and 21a.

Closing the ends of the bore 11 and chambers 12 and 13 at one end of the casing is a head or cover plate 26 carrying a boss 27 having an opening 28 extending therethrough which aligns axially with the bore 11. Formed in the inner side of the cover plate 26 in spaced parallel relation to the opening 28 are recesses 29 and 30 which align axially with the chambers 12 and 13 respectively. The cover plate is also provided with substantially U-shaped passages 31 and 32 which communicate respectively with the passages 14 and 15 through diametrically spaced ports 33 and 34 with the chamber 12. Similar U-shaped passages 35 and 36 are formed in the cover plate 26 and communicate respectively with the passages 16 and 17 in the casing 10 and with ports 37 and 38 which open into the chamber 13 in diametrically spaced relation.

A gear case designated generally 39 is carried by the end of the casing 10 remote from the cover plate 26 and comprises an end wall 40, and a peripheral wall 41. The end wall 40 is formed with spaced parallel openings 42, 43 and 44 extending therethrough which lie respectively in axial alignment with the opening 28 and recesses 29 and 30 in the cover plate 26. The gear case 39 has extending therethrough in spaced parallel relation to the openings 42, 43 and 44, spaced passages 45 and 46 which communicate respectively with the passages 14 and 15 in the casing 10, and similar passages 47 and 48 which communicate respectively with the passages 16 and 17 in the casing 10. Extending through the gear case 39 in spaced relation to the opening 42 are passages 49 and 50 which open into the recesses 22 and 23 respectively and passages 51 and 52 which open respectively into the recesses 24 and 25. Formed in the end wall 40 of the gear casing 39 are passages 53 and 54 which establish communication between the passages 45 and 46 and diametrically spaced ports 55 and 56 respectively which open in diametrically spaced relation into the chamber 12. Similar passages 57 and 58 are formed in said end wall 40 and establish communication between the passages 47 and 48 and diametrically spaced ports 58' and 59 which open in diametrically spaced relation into the chamber 13. The ports 55 and 56 align axially with the ports 33 and 34, respectively, and the ports 58' and 59 align axially with the ports 37 and 38, respectively.

Fixed to the end of the gear case 39 remote from the casing 10 is a valve housing designated generally 60 which is provided in its end remote from the gear case with conical valve chambers 61 and 62 which align axially with the chambers 12 and 13 respectively in casing 10. Communicating with the valve chamber 61 at spaced points are passages 62' and 63 which extend through the end of the valve housing 60 adjacent the gear case 39 and open respectively into the passages 45 and 46 therein. Similar passages 64 and 65 are formed in the valve housing 60 and communicate at spaced points with the valve chamber 62 therein and like the passages 62' and 63 open through the end of the valve housing adjacent the gear case 39 to establish communication with the passages 47 and 48 in the gear case 39. Similar passages 66 and 67 communicate with the valve chamber 61 in circumferentially spaced relation and said passages 66 and 67 open through the end of the valve housing 60 adjacent the gear case 39 to establish communication with the passages 49 and 50 in said gear case 39. Passages 68 and 69 like the passages just described open in circumferentially spaced relation into the valve chamber 62 and extend through the wall thereof adjacent the gear case 39 to establish communication respectively with the passages 51 and 52 therein. Formed in the valve housing 60 perpendicular to the axes of the valve chambers 61 and 62 and communicating at opposite ends with said chambers is a discharge passage 70 which communicates midway between the valve chambers 61 and 62 with a discharge passage 71. This discharge passage 71 extends through a boss 72 which is carried by said valve housing and projects outwardly therefrom midway between and in parallel relation to the axes of the chambers 61 and 62. Opening through opposite ends of the valve housing 60 and communicating respectively with the chambers 61 and 62 diametrically opposite ends of the passage 70 are inlet passages 73 and 74 to the outer ends of which is coupled an intake manifold 75. Extending through the valve housing 60 midway between the valve chambers 61 and 62 and above the passage 70 is an internally screw threaded opening 76 the purpose of which will hereinafter appear.

The open ends of the valve chambers 61 and 62 are respectively closed by plugs 77 and 78 having respectively axial openings 79 and 80 extending therethrough.

Extending through said openings 79 and 80 are valve stems 81 and 82 carrying at their respective inner ends conical valves 83 and 84 the peripheries of which snugly fit the walls of the conical valve chambers 61 and 62. The valve 83 is formed on one side of the axis thereof with a passage 85 which communicates at opposite ends with peripherally spaced ports 86 and 87. Entering the valve 83 between the ports 86 and 87 are circumferentially spaced ports 88 and 89 which open into the passage 85. A passage 90 extends through said valve 83 on the side of the axis thereof opposite the passage 85 and said passage 90 communicates with peripherally spaced ports 91 and 92 and communicating with this passage 90 between the ports 91 and 92 are peripherally spaced ports 91' and 92'.

Like the valve 83 the valve 84 is provided on one side of its axis with a passage 93 which communicates at opposite ends with peripherally spaced ports 94 and 95 between which are peripherally spaced ports 96 and 97 which communicate with the passage 93. A passage 98 extends through the valve 84 to the side of the axis thereof opposite the passage 93 and communicates at opposite ends with circumferentially spaced ports 99 and 100. Opening through said valve 84 between the ports 99 and 100 are circumferentially spaced ports 101 and 102 which communicate with the passage 98.

Carried on the outer ends of the valve stems 81 and 82 respectively are levers 103 and 104 and pivotally coupled to said levers remote from the valve stems 81 and 82 is a link 105 by which the levers 103 and 104 are moved in unison to rotate their respective valves 83 and 84. A hand lever 106 is pivotally mounted on the boss 72 and is pivotally coupled to the link 105 midway between opposite ends thereof for moving said link 105 and rotating the valves 83 and 84 in unison.

Mounted for rotation in the aligned openings 28 and 42 are trunnions 107 and 108 of a rotor 109 which rotates about its axis in concentric relation to the bore 11 in the casing 10 and carried by the trunnion 107 which projects through the opening 28 is an axial extension 110 to which is fixed in any conventional manner a pulley 111 or the like. Entering the trunnion 108 and extending therethrough and into the trunnion 107 is an axial bore 112 having longitudinally spaced radial bores 113 and 114 communicating therewith. These bores 113 and 114 open through the sides of their respective trunnions 107 and 108 and into the openings 28 and 42 respectively. The trunnion 108 and hence the bore 112 terminates within the gear case 39 and keyed or otherwise secured to the trunnion 108 within the gear case 39 is a drive gear 115. Formed in the periphery of the rotor 109 are circumferentially spaced grooves which extend parallel to the axis of the rotor and seated in said grooves are outwardly extending radial blades 116, 117 and 118 which move in a circular path which intersects the chambers 12 and 13. These blades closely contact the walls of the bore 11 and are secured in the bottoms of the grooves in the rotor 109 in any suitable manner.

Mounted for rotation in the recess 29 and extending through the aligned opening 44 is a shaft 119 upon which is mounted a circular cylindrical member 120 which rotates in the chamber 12 in close contact with the walls thereof. This circular cylindrical member 120 is provided in its periphery with diametrically spaced recesses 121 and 122 which receive the blades 116, 117 and 118 as the rotor 109 is rotated. A drive pinion 115a is fixed to the shaft 119 within the gear case 39 and has meshing engagement with the gear 115 so that the member 120 will be positively driven by the rotor 109. It is to be noted that except when the parts are in a position where a blade 116, 117 or 118 enters one of the recesses 121 or 122, the circular cylindrical member 120 is in peripheral contact with the rotor 109. Journaled in the recess 30 and in the aligning opening 44 is a shaft 123 which extends into the gear case 39 and has secured thereto within said gear case a drive pinion 115a which has meshing engagement with the drive gear 115 so that the shaft 123 will be rotated as the rotor 109 turns about its axis. Mounted on the shaft 123 to rotate therewith within the chamber 13 is a circular cylindrical member 125 which like the circular cylindrical member 120 is provided with diametrically opposite recesses 126 and 127 which receive the blades 116, 117 and 118 as the rotor 109 turns about its axis. Like the circular cylindrical member 120, the circular cylindrical member 125 has peripheral contact with the rotor except when a blade enters one of the recesses 126 or 127.

Threaded into the threaded opening 76 in the valve casing 60 is one leg 128 of an L-shaped fitting designated generally 129 and opening through the end of the leg 128 is a relatively large bore 130 in which a piston designated generally 131 is mounted to reciprocate. A compression coil spring 132 is seated against the inner end of the bore 130 and bears on the piston 131 to yieldingly urge it out of the end of the bore 130 and into contact with a cam track 133 carried by the gear 115 which slopes as illustrated in Figure 2, to cause the piston 131 to reciprocate against the effort of the spring 132. The inner end of the bore 130 communicates with a bore 134 formed in the leg 135 of the fitting 129 which contains a spring actuated valve 136 which normally closes a feed duct 137 through which lubricant such as machine oil is fed to the bore 130. The piston 131 comprises a body 138 having an axial bore 139 entering one end and a radial bore 140 adjacent the opposite end which establishes communication between the axial bore 139 and the interior of the gear case 39. Entering the end of the bore 139 remote from the radial bore 140 is a plug 141 having an axial bore 142 extending therethrough. A spring pressed ball 143 yieldingly seats against the inner end of the plug 141 to close the bore 142 therein. It is to be understood that the spring actuating the ball 136 is of less power than the spring 132 which moves the piston 131 so that when the piston 131 moves under the influence of its spring 132 the ball 136 will move out of closing relation to the duct 137 to allow fluid to enter the bore 130. Obviously with the bore 130 filled with lubricant and the piston 131 positively moved by the cam track 133 the ball 143 will be moved away from its contact with the end of the plug 141 and the fluid will be expelled through the radial passage 140 into the interior of the gear case 39. It is manifest that with the gear case filled with lubricant and with additional lubricant being injected thereinto by the action of the piston in the bore 130, lubricant will be forced into the bearings through the bore 112 and the radial bores 113 and 114.

The parts are assembled with the cover plate 26 closing the end of the casing 10 having the grooves 18, 19, 20 and 21 and the gear case 39 closing the opposite end of the casing 10 having the grooves 18a, 19a, 20a and 21a thereon with the flange 41 of the gear case 39 projecting away from the casing 10. The valve housing 60 closes the end of the gear case 39 remote from the casing 10. With the rotor 109 in place in the bore 11 and the circular cylindrical members 120 and 125 in their respective chambers 12 and 13, the gear 115 is meshed with the pinions 115a and 115b to rotate the circular cylindrical members 120 and 125 in timed relation with the rotor 109 so that as a blade 116, 117 or 118 approaches a chamber 12, it will enter one of the recesses 121 and 122 in the circular cylindrical member 120 and as one of the blades 116, 117 or 118 approaches the chamber 13 it will enter one of the recesses 126 or 127 in the circular cylindrical member 125.

When so assembled the passages 62', 63, 64 and 65 in the valve housing 60 open into the passage 45, 46, 47 and 48 respectively in the gear case 39. The passages 45, 46, 47 and 48 in the gear case in turn open into the passages 14, 15, 16 and 17 respectively in the casing 10, and the passages 49 and 50 and 51 and 52 open into the passages 22 and 23 and 24 and 25 respectively. The ends of the passages 14 and 15 adjacent the cover plate 26 open into the passages 31 and 32 respectively and hence with the chamber 12 at its end adjacent the cover plate 26 through the ports 33 and 34. It will thus be seen that fluid entering the passage 85 through the port 89 in the valve 83 will pass through the passages 62', 45, 14 and 31 to enter the chamber 12 through port 33. Such fluid will also flow through passage 53 and port 55 into the chamber 12 at the opposite end thereof. Entering said chamber 12 through the ports 18 and 18a the fluid will flow into the chamber A in the bore 11 from between the circular cylindrical member 120 and the blade 117 thus to exert its expansive force on the walls of the chamber A and cause the blade 117 to recede from the circular cylindrical member 120 and turn the rotor 109 in a clockwise direction when viewed as in Figure 3. Since the passage 90 in the valve 83 establishes communication between the discharge passage 70 and the passage 63 when the valve 83 is in the position shown in Figure 1, it will be evident that fluid contained in the chamber B in the bore 11 between the blade 118 and the circular cylindrical member may escape through the ports 19 and 19a into the passage 15 through the passages 32 and 54 respectively in the cover plate 26 in the gear case 39, from whence it enters the passage 46 in said gear case 39 through which it is conveyed to the passage 63 in the valve housing 60 and through the passage 90 and port 92' to the discharge passage 70. Simultaneously with the flow of fluid through the chamber 12 as just described, fluid flowing from the manifold 75 enters the passage 93 in the valve 84 through the passage 74 and port 96 and is directed through the port 95 into the passage 65 from whence it enters the passage 48 in the gear case 39 through which it is conducted to the passage 17 in the casing 10. The fluid also flows through branch passage 58 to enter the chamber 13 through the port 59 when a recess 126 or 127 in the cylindrical member 125 registers with said port 59. Flowing through the passage 17 the fluid enters the passage 36 in the end plate 26 and is delivered through the port 38 into the chamber 13 when a recess 126 or 127 registers therewith. The fluid flowing through the chamber 13 enters a chamber C formed in the bore 11 between the cylindrical member 125 and the blade 118 through the ports 21 and 21a to exert expansive force against the blade 118. The spent fluid in chamber D formed in the bore 11 between the blade 117 and the circular cylindrical member 125 is expelled through the ports 20 and 20a through passage 35 in the cover plate 26 and into the passage 16 in the casing 10. Simultaneously the fluid is also expelled through the port 58' in the gear case 39 into the passage 47 therein through the passage 57. The passage 47 opens into the passage 64 in the valve casing 60. With the passage 98 in the valve 84 communicating through port 99 with the passage 64 and the port 102 registering with the discharge passage 70, it will be evident that the spent fluid will be discharged. Obviously by moving the hand lever 106 to the dotted line position shown in Figure 12, the ports 92 and 92' in the valve 83 will be closed but the ports 91 and 91' will respectively communicate with the passages 68 and 70 while the ports 88 and 87 register respectively with the passage 73 and the passage 63 thus introducing fluid entering the passage 73 from the manifold 75 into the chamber 12 through passages 63, 46, 15, 32 and 54 into the chamber 12 so that it enters the bore 11 through ports 19 and 19a and the chamber B formed between the circular cylindrical member 120 and the blade 118. Simultaneously the chamber A formed between the circular cylindrical member 120 and the blade 117 will be opened to the discharge passage 70 through ports 18 and 18a and passages 23, 50 and 67, port 92, passage 98 and port 91' in the valve 83. Simultaneously with the movement of the valve 83 to bring the ports 87 and 88 into registry with the passages 63 and 73 respectively, the valve 84 will be rotated to bring the ports 101 and 102 into registry with the passages 70 and 69 respectively and the ports 96 and 97 into registry with the passages 64 and 74 respectively. Thus fluid from the passage 74 will enter the chamber D formed in the bore 11 between the circular cylindrical member 125 and the blade 117 through passages 64, 47, 16, 35 and 57 and communication between the chamber C, formed in the bore 11 between the blade 118 and the circular cylindrical member 125, and the discharge passage 70 will be established through passages 25, 52, 68 and ports 101 and 102 in the valve 84. Thus it will be seen that by shifting the hand lever 106 from one position to the other, the rotor 108 and hence the drive pulley 111 may be made to rotate in a clockwise or counterclockwise direction.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a fluid motor, an open sided casing having a central transverse bore and a pair of oppositely disposed cylindrical transverse bores extending parallel to and opening into the first bore, a cover plate closing one side of said casing, a gear case closing the other side of said casing and having its outer side open, cooperative rotary elements in said bores, trunnions carried by said elements in said oppositely disposed bores having bearing in said cover plate and the inner side of said gear case, other trunnions carried by the intermediate element projecting outwardly through said cover plate and the inner side of said gear case, intermeshing gears within said gear case mounted on the adjacent trunnions of said elements, said intermediate element having an axial bore extending through the same with its outer end terminating within the outer trunnion and its other end opening through the inner trunnion into said gear case, said axial bore having ducts opening radially therefrom at the points of bearing of said other trunnions in said end plate and the inner side of the gear case, a valve plate closing the open side of said gear case, a valve mechanism carried by said valve plate for controlling the operative fluid for said elements, and a means operable from one of said gears for introducing a lubricant to said gear case for its distribution to the points of bearing of the trunnions of said intermediate element by way of the axial bore and said radial ducts.

2. The fluid motor as defined in claim 1, with the said means comprising an inlet connection with a source of lubricant supply opening through said valve plate for the discharge of the lubricant into said gear case, a piston slidable in said inlet connection, a coil spring within said inlet connection urging said piston into partially projected state into said gear case, said piston having an axial bore opening through its outer end and communicating with a radial outlet passage at its inner end, a plug having an axial passage therethrough threaded into the open end of said axial bore, a spring tensioned valve element within said axial bore and closing the latter passage in one position of said piston, and a cam track carried by the said one gear for actuating said piston to periodically cause the discharge of a replacement amount of the lubricant into said gear case.

References Cited in the file of this patent

UNITED STATES PATENTS

| Number | Name | Date |
|--------|------|------|
| 273,916 | Tverskoy | Mar. 13, 1883 |
| 274,475 | Forbes | Mar. 27, 1883 |
| 274,476 | Forbes | Mar. 27, 1883 |
| 606,606 | Unbehend | June 28, 1898 |
| 632,549 | Callihan | Sept. 5, 1899 |
| 902,225 | Friend | Oct. 27, 1908 |
| 994,825 | Dunbar | June 13, 1911 |